United States Patent [19]

Johnson et al.

[11] 4,315,677

[45] Feb. 16, 1982

[54] CALIBRATION ARRANGEMENT FOR EXPOSURE CONTROL SYSTEM

[75] Inventors: Bruce K. Johnson, Andover; George D. Whiteside, Lexington, both of Mass.

[73] Assignee: Polaroid Corporation, Cambridge, Mass.

[21] Appl. No.: 165,510

[22] Filed: Jul. 3, 1980

[51] Int. Cl.$^3$ .............................................. G03B 7/08
[52] U.S. Cl. ........................................ 354/49; 354/59
[58] Field of Search ..................... 354/27, 42, 49, 59; 250/482, 216; 356/225; 350/1.1–1.4, 313–317

[56] References Cited

U.S. PATENT DOCUMENTS

| | | | |
|---|---|---|---|
| 3,545,870 | 12/1970 | Burgarella | 354/59 |
| 3,832,722 | 8/1974 | Douglas | 354/59 X |
| 3,848,985 | 11/1974 | Bennett | 354/42 |
| 3,942,184 | 3/1976 | Blinow et al. | 354/42 |
| 3,975,744 | 8/1976 | Johnson et al. | 354/59 X |
| 4,007,468 | 2/1977 | Blinow et al. | 354/59 |
| 4,200,379 | 4/1980 | Erlichman | 354/27 X |

Primary Examiner—Joseph W. Hartary
Assistant Examiner—William B. Perkey
Attorney, Agent, or Firm—Leslie J. Payne

[57] ABSTRACT

A calibrating arrangement is disclosed for use in accurately correcting for exposure errors in an exposure control system having a plurality of photoresponsive regions. A scene light detecting and integrating circuit includes a pair of photoresponsive regions. Each region provides an output response as a function of its photoresponsiveness to the scene radiation intensity incident thereon. A first light attenuating member is selectively positioned to attenuate scene radiation incident to at least one of the regions so that the output of the one region can be correlated to a preselected output therefor. Independently positionable relative to at least the other region is a second light attenuating member. The second attenuating member is movable independently of the first light attenuating member to attenuate scene radiation incident to at least the other region so that the output of the other region can be correlated to a preselected output therefor.

10 Claims, 3 Drawing Figures

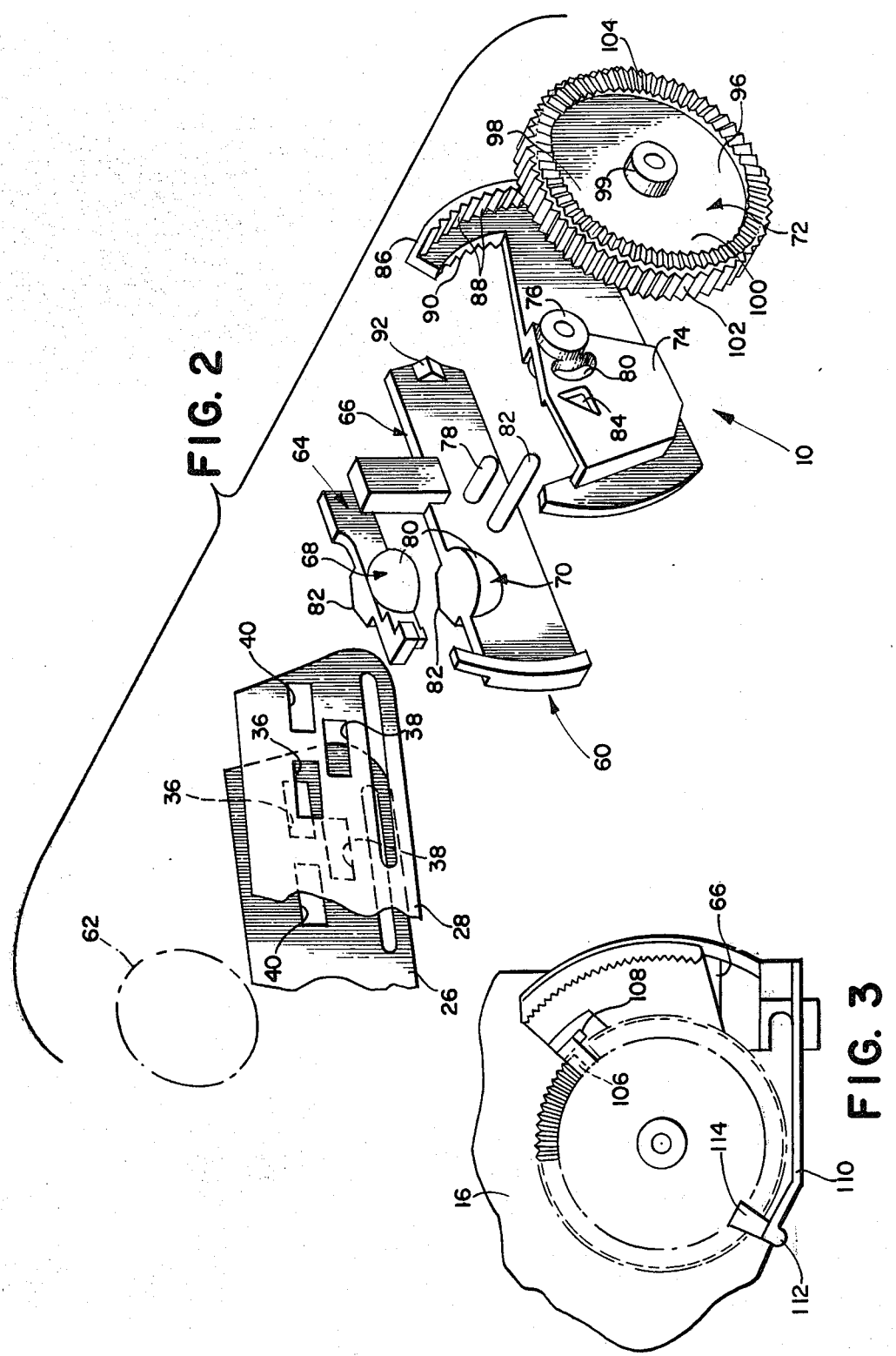

CALIBRATION ARRANGEMENT FOR EXPOSURE CONTROL SYSTEM

BACKGROUND OF THE INVENTION

This invention in general relates to control of exposure control systems for use in photographic apparatus. More particularly, it concerns an improved apparatus facilitating calibration of the exposure control system.

Automatic exposure control systems in the photographic arts are well known. Essentially, these systems evaluate scene brightness levels of illumination for controlling exposure parameters including effective aperture size and exposure interval. Included in such a system is a photocell and operably connected thereto a scene radiation integrating and control circuit. In use, the photocell senses scene radiation incident thereon, while the circuit integrates the photocell's signal until a predetermined circuit output signal is achieved which corresponds to a particular exposure value. This output signal is effective for terminating the exposure interval of a shutter mechanism.

Such exposure control systems, in theory, should provide the designed for exposure values. In practice, however, since exposure is a function of many variable factors, there is potential for the exposure values actually produced by any such system to vary from the values designed for. These variations in exposure values often result from the cumulative effect of variations, typically within prescribed tolerances, of the optical, electronic and shutter blade systems. Thus, tolerance variations of, for example, individual electronic components making up the photocell transducer and the noted integrating and control circuitry and variations in the transmissivity properties of the optical system of the photocell can cause variations in exposure values. Obviously, correcting for such variations is of critical concern in insuring proper exposure for achieving satisfactory photographic results.

To eliminate such exposure differences between identically designed exposure control systems, it is often necessary that each such system be calibrated individually for admitting precisely the amount of light to the film plane which is required by a particular film of predetermined speed to achieve a correct exposure.

Attempts at calibrating the exposure control systems have included insertion of different neutral density filters, one at a time, into scene light intercepting relation with respect to the scene light directed to the phototransducer. A photographic exposure cycle is completed after insertion of each filter for determining the resulting exposure. This process continues until the best filter is found which operates to most closely correlate the exposure to the exposure intended for a selected film speed. One commercially available camera calibrated in the above-described manner is the SX-70 camera manufactured by Polaroid Corporation. Obviously, calibration in the above manner is not only time-consuming but expensive. Because of the large number of possible exposure variations, a large number of different filters must be maintained in stock for effecting the desired calibration. Hence, the foregoing described calibrating technique is less than satisfactory.

A significant improvement over the foregoing calibrating approach is described in U.S. Pat. No. 3,942,184 issued to I. Blinow et al. and assigned in common herewith. This approach utilized a neutral density filter which is selectively rotated into the scene light path of the photocell detector so as to vary the intensity of the scene light incident on the detector. In this manner, the output response of the detector serves to terminate an exposure interval in time to insure that the amount of scene light incident to the film plane substantially corresponds to the select film speed so as to provide the desired exposure.

SUMMARY OF THE INVENTION

According to the present invention, there is an improved apparatus for use in a photographic apparatus having scene radiation evaluating means for controlling the camera shutter to provide an appropriate exposure of given film material. The evaluating means includes photoresponsive regions having different photoresponsive chaaracteristics and means for adjusting the intensity of scene radiation incident upon said regions for calibrating the evaluating means to provide a predetermined responsive for given scene radiation conditions.

In one embodiment, the attenuating means includes first means selectively movable into radiation intercepting relation with respect to both said regions to substantially precisely adjust the output of one of the regions, while also coarsely adjusting the output of the other regions under a given scene radiation condition. Second means is movable into radiation intercepting relation with respect to only the second region to, in combination with the first means, substantially precisely adjust the output of the other region.

In a preferred embodiment, one of the photoresponsive regions serves to block infrared frequencies while the other photoresponsive region serves to transmit exclusively infrared frequencies.

Among the objects of the invention are, therefore, the provision of an improved apparatus for photographic apparatus wherein the output response of an exposure control system is calibrated to correct for variations from the intended exposure required; and the provision of an improved calibration apparatus for selectively and independently positioning light attenuating members before corresponding photocell regions having different responsive characteristics.

Other objects and further scope of applicability of the present invention will become apparent after reading a detailed description thereof when taken in conjunction with the accompanying drawings in which like parts are designated by like reference numerals.

BRIEF DESCRIPTION OF THE DRAWINGS

FIG. 2 is an exploded perspective view of the improved calibrating system of this invention; and FIG. 3 is a fragmentary elevational view depicting the calibrating system in an assembled condition.

DETAILED DESCRIPTION

Figure 1:
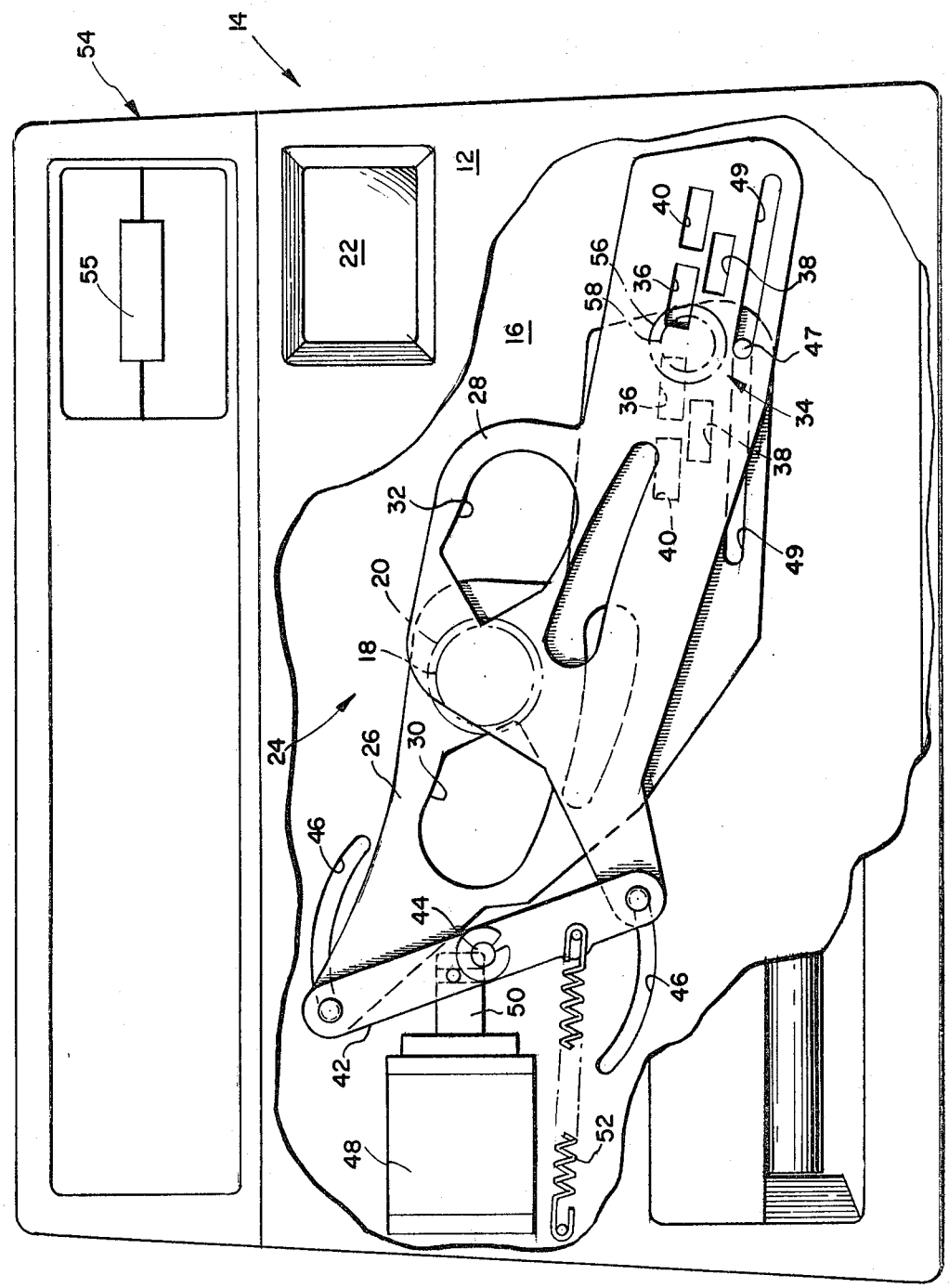
FIG. 1 is a diagrammatic front elevational view depicting a photographic camera including a blade mechanism illustrated in a closed condition.

Reference is made to FIGS. 1 to 3 for showing the improved exposure control calibration system 10 of the present invention. The calibration system 10 is included in housing 12 of photographic apparatus 14, see FIG. 1. Also included within the camera housing 12 is a rear block casting 16 which is constructed to support the components of the exposure control system and the calibration system 10. Centrally formed in the rear block casting 16 is a light exposure aperture 18 constructed for defining the maximum available exposure aperture of the system as well as for allowing scene light to a photographic film unit (not shown) of a film pack also not shown. The film unit is housed in a suitable housing chamber (not shown). Examples of such film units and film packs are described in U.S. Pat. Nos. 3,543,662; 3,705,542; 3,748,984; and 3,779,770. These kinds are manufactured and sold by the Polaroid Corporation, Cambridge, Massachusetts. Each of the film units of the pack is successively positioned at the focal plane of the camera 14. It is noted that the camera 14 is of the self-developing kind and is usable with the above film type.

Mounted on a front wall of the housing 12, in overlying relationship to the exposure opening 18 and the blades, is a taking lens or objective lens 20 of the fixed focus type. The taking lens 20 focuses the image-carrying rays or scene radiation from the scene to be photographed along the exposure path to a mirror (not shown) disposed in the housing 12. The lens 20 is of a fixed-focus type. It will be appreciated that an adjustable or variable focal lens assembly can be employed instead. From the mirror the rays are reflected to the uppermost film unit of the film pack which unit is located at the focal plane. Located in the front face of the camera housing 12 is a viewing window 22. The viewing window 22 operates in conjunction with a viewing system (not shown) for permitting viewing and framing of the scene to be photographed. Control of the exposure path is provided by the exposure control system 24.

Although the exposure control system 24 is described for use with photographic cameras of the non-reflex type, the intended scope of this invention is by no means so limited. Accordingly, the cameras of the well-known reflex type, such as described in U.S. Pat. No. 3,672,281, entitled "Reflex Camera", by E. H. Land, commonly assigned herewith may be equally suitable for use in conjunction with the exposure calibration system 10.

Included in the exposure control system 24 is a blade mechanism of the scanning shutter type having overlapping shutter blade elements 26 and 28. Since the exposure control system 24 including the blade mechanism does not by themselves form an aspect of the present invention, only a description of their construction and operation necessary for a complete understanding of this invention will be set forth. However, for greater details regarding the construction and operation thereof, reference is made to commonly assigned U.S. Pat. No. 4,040,072.

With continued reference to FIGS. 1 through 3, the shutter blades 26, 28 are supported in the casting 16 so as to be positioned intermediate the objective lens 20 and the light exposure aperture 18. Formed in the blade elements 26, 28 is a taking or scene light emitting primary aperture 30 and 32; respectively. For defining progressively increasing primary aperture values as a function of blade displacement, the taking apertures 30 and 32 coincide and overlap each other progressively over the light exposure aperture 18 during blade scanning.

Defined by the shutter blades 26, 28 is a plurality of secondary or photocell apertures indicated generally by reference numeral 34. Each of the shutter blades 26, 28 includes photocell apertures 36, 38 and 40 which move in correspondence with the taking apertures 30, 32. Photocell apertures 36, 38, and 40 on each blade form corresponding pairs of such apertures 36, 36, etc. for defining progressively varying effective photocell apertures during blade displacement. The photocell apertures 36-40, therefore, effectively and automatically control the path and amount of scene radiation emanating from the scene and passing along an exposure path through a photocell window (not shown) mounted on the housing 12.

Distal ends of the shutter blades 26, 28 are pivotally connected to distal ends of a walking beam 42. In turn, the walking beam 42 is pivotally connected to the casting 16 by means of a pivot pin 44. Distal ends of the walking beam 42 have pin members extending through respective openings in the end of the blades 26, 28. These pins slidably engage respective arcuate slots 46 formed in the block casting 16 for prohibiting shutter blade disengagement during exposure control operation.

Projecting from the base block casting 16 at a location spaced laterally apart from the light entering exposure opening 18 is a pivot pin or stud 47 which engages elongated slots 49 and formed in respective shutter blades 26 and 28 for permitting pivotal and translating movement of the latter. Pin 47 may be integrally formed with the base block casting 16 and blade elements 26 and 28 may be retained in engaging relation with respect to the pin 47 by any suitable means, such as peening.

Displacement of the shutter blades 26, 30 is provided, in part, by a tractive electromagnetic device or solenoid 48. Included in the solenoid 48 is an internally arranged and displaceable cylindrical plunger unit 50. This plunger unit 50 retracts upon energization of the solenoid. For effecting movement of the walking beam 42 in response to energization of the solenoid, the cylindrical plunger 50 is affixed at its terminal ends by means of a pivot pin or stud to the walking beam. Hence, longitudinal displacement of the plunger unit 50 results in appropriate displacement of the shutter blades 26, 28.

For continuously urging the taking apertures 30, 32 and the sets of photocell apertures 36-40 to positions defining their effective apertures, there is provided a biasing spring 52. Towards this end, one end of the spring 52 is affixed to the block casting 16 while its opposite end is attached to the walking beam 42. As should be understood readily, the exposure control system 24 is also applicable to photographic systems wherein the shutter blades 26, 28 are spring biased to a normally closed position and the energization of the solenoid 48 effects movement of the shutter blades to their normally open condition.

For conserving battery power, the solenoid 48 should not be continuously energized when maintaining the shutter blades 26, 28 in their scene light blocking condition (FIG. 1). A latch mechanism (not shown) is provided towards this end for automatically latching the walking beam 42 so that the blades 26, 28 are in the scene light blocking condition at the end of each exposure. Accordingly, the solenoid 48 can be deenergized when the blades 26, 28 are at rest. With this latching arrangement, unlatching of the noted mechanism commences upon exposure. Unlatching frees the blades 26, 28 to move under the influence of the spring 52 to a scene light admitting condition in accordance with the control provided by the noted exposure control system 24. Details of this latching mechanism including its operation do not, however, form an aspect of this invention. Therefore, reference is made to the last noted U.S. Pat. No. 4,040,072 for a more detailed description of its description and operation.

Reference is now made to the flash strobe unit 54. Only details necessary for an understanding of the present invention will be set forth insofar as this type of flash strobe unit 54 does not, per se, form an aspect of the present invention. For a more detailed description of one type of electronic flash apparatus usable in conjunction with the present invention, reference is made to copending application Ser. No. 74,993, filed on Sept. 13, 1979, and commonly assigned with the present application.

The electronic flash strobe unit 54 is affixed to an upper surface of the camera housing 12. Included in the flash unit 54 is a flash discharge tube 55 located in a suitable reflector behind a lens. A quench tube (not shown) is provided for interrupting a flash discharge of the flash discharge tube. Electrical power for the electronic flash strobe unit is provided by a battery (not shown) carried in the film pack. For charging the strobe, a camera actuator button (not shown) is actuated for enabling the strobe unit 54 for subsequent firing and also for releasing the shutter latch mechanism as previously described. Thus, the shutter blade movement is permitted to commence for purposes of beginning the exposure cycle.

For effectively and automatically controlling the path of scene light to the photosensitive film, there is provided a light detecting station 56.

Referring to the light detecting station 56, it includes a photoresponsive device 58 which is aligned with the photocell light entry window (not shown) in the housing 12. An integrating control circuit omitted for clarity is also formed in the light detecting station 56 for collectively operating with the photoresponsive device 58 for terminating the exposure interval as a function of the time integration of the intensity of scene light incident upon the photocell as permitted by the overlapping sets of photocell apertures 36–40. The control circuit will generate a command signal upon sensing a predetermined amount of scene radiation for reenergizing the solenoid 48 and thereby terminating the exposure interval. Construction of the light detecting station 56, has not been described since it does not, per se, form an aspect of the present invention. However, an exposure control system 24 embodying the above-described light detecting station 56 is described more fully in copending and commonly assigned U.S. patent application Ser. No. 156,198, entitled "Method and Apparatus For Selectively Positioning Spectral Filter", by Bruce K. Johnson, filed on June 3, 1980.

With particular reference to FIG. 3, the photoresponsive device 58 includes a photocell lens assembly 60 and spaced linearly therefrom a photocell detector 62 of the silicon photodiode type. The photodetector 62 produces a current output when subjected to incident radiation. It will be appreciated that the photocell lens assembly 60 is in optical alignment with the photocell light entry window. The photodetector 62 receives scene radiation as controlled by the photocell apertures 36–40. Positioned intermediate the photocell lens/assembly and the photocell detector 62 is the pair of reciprocatable scanning shutter blades 26, 28.

In the illustrated embodiment, the photocell lens assembly 60 has upper and lower joinable split lens components 64 and 66; respectively. These split lens components 64, 66 are constructed to be mounted on and supported by the casting 16. Longitudinally intermediate each lens components 64, 66 is an optical lens element 68 and 70; respectively. These lens elements 68, 70 do not, per se, form an aspect of the present invention. Therefore, only those details necessary to understand the present invention will be set forth. For more details of their construction and function, reference is made to the last noted copending application. Essentially, each of the generally symmetrically formed and positioned optical lens elements 68, 70 receives radiation from the scene and introduces such radiation to the photodetector 62. Additionally, the optical lens elements 68, 70 are constructed to provide a desired spectral filtering of the scene radiation, in a manner to be discussed presently.

Briefly, both the upper and lower optical lens elements 68, 70 include front convex surface 80, preferably with a spherical-like shape, and a rear prism-like conformation 82. These prism conformations 82 are constructed to be supported in and received by a suitable window (not shown) formed in casting 16 so as to be aligned optically with the photodetector 62 for converging scene radiation to the latter.

Preferably, each of the optical lens elements 68, 70 is molded as a single plastic piece having optical properties of the kind to be presently described. In this regard, the upper lens element 68 provides spectral filtering, so that spectral frequencies in the visible region (e.g., 400–700 nm) are transmitted, while spectral frequencies in the near infrared IR region (e.g., 700–1200 nm) are blocked. On the other hand, the lens element 70 functions conversely to the kind of spectral filtering provided by the upper lens elememt 68. In particular, the lower lens element 70 transmits frequencies in the near infrared IR region, while excludes frequencies in the noted visible spectrum. It will be appreciated that the light detecting station 56 provides means for sensing and evaluating scene radiation. Each lens element 68, 70 in conjunction with the photodetector 62 provide a photoresponsive region which is responsive to the noted frequencies transmitted to the photodetector.

For exposure control purposes, the upper optical lens element 68 is used predominantly in situations involving moderate-to-high ambient light, when the primary aperture values are less than maximum. With the scene light being spectrally filtered to block IR, the potential of overexposing blue sky is eliminated. As noted above, a flash can be fired during this type of ambient exposure and the reflected light thereof evaluated in accordance with the invention without the benefit of IR radiation. Since flash contribution under these levels of ambient light is not controlling, the lack of precise flash accuracy is tolerated in favor of ambient control. The lower optical lens element 70 is used predominantly in situations involving firings of the flash strobe unit 54, when the ambient light is very low and, accordingly, the flash contribution is significant as compared to the ambient. Under these situations, the primary effective aperture is at a maximum and only the infrared spectral frequencies will be evaluated by the photodetector 62. Hence, the likelihood of disparate reflectivity values of light in the visible region influencing the photodetector 62 is eliminated and the relatively more uniform reflectivity values of the infrared frequencies are utilized. The significant advantages of employing such a combination of spectral filters, as mentioned, during an exposure cycle are more fully described in the last noted copending application.

For purposes of describing the functional cooperation of the scanning type shutter blades 26, 28 with respect to the upper and lower optical lens elements 68,

70 for exposure control purposes, reference is made to FIG. 2 and the last noted copending application. However, a brief description of its operation is given for purposes of better understanding this invention.

In the scene light blocking condition (FIG. 1), neither the taking apertures 30, 32 nor any of the pairs of sweep apertures 36-40 overlap. During blade displacement following commencement of the exposure cycle the photocell apertures 36, 36 initially overlap. In doing so they direct scene radiation through the upper optical lens element 68. Accordingly, only scene radiation having visible spectral frequencies will be transmitted by the photodetector 62 and evaluated by the control circuit since the infrared IR frequencies will be blocked. This overlapping of the apertures 36 occurs during high ambient light conditions, when infrared frequencies are undesired and further when flash contribution is not as great.

Continued shutter blade displacement to the maximum scene light admitting condition results in the second set of sweep photocell apertures 38 overlapping over the lower optical element 70. Accordingly, only infrared (IR) frequencies will be directed to the photodetector 62, since the visible light frequencies are blocked. Advantageously, with exclusive use of infrared frequencies, the reflectivity values thereof do not vary as widely as do visible light reflectivity values. This is true particularly in the strobe mode (i.e., effect of the flash contribution upon photodetector is greater than in ambient). Consequently, the likelihood of relatively high reflectivity value differences causing poor photographs during the strobe mode is minimized. Thus, the quality of the resultant photograph is improved markedly.

The third set of photocell sweep apertures 40 are constructed for overlapping each other during continued shutter blade displacement as the apertures 38 close. This overlapping of apertures 40 changes the scene radiation path to the photodetector whereby the scene radiation is directed to the upper optical lens element 68. Such overlapping occurs when there is predominantly low ambient light and where flash effect on the photodetector is negligible. These conditions can occur, for example, during early morning or late evening (e.g., under low light conditions) with a distant photographic subject (e.g., when taking pictures of the Grand Canyon, wherein the objects of the scene are too remote to reflect a significant amount of flash intensity. Under such conditions, it is preferred to return to scene evaluation excluding IR radiation. Hence, the upper lens element 68 is used for such purposes.

Reference is now made to FIGS. 2-3 for better describing the calibrating system 10. Essentially, the calibrating system 10 includes first and second light attenuating members 72, 74; respectively. Each of the light attenuating members 72, 74 are independently movable relative to each other for independently controlling the amount of light passing to the lens elements 68, 70. Owing to this dual adjustablility feature, it will be appreciated that the output response of the photodetector 62 can be varied by suitably varying the positioning of the light attenuating members 72, 74 so as to control the amount of scene radiation incident on the latter.

First referring to the light attenuating wedge member 74, it has a generally wedge-like shape having a hub section 76 centrally formed therein for rotatable mounting on a stub shaft 78 extending from a face of the lower split lens component 66. A generally arcuate opening 80 is formed in the wedge member 74 to the left of the hub section 76 (as viewed in FIG. 2) and is sized and shaped to have an elongated limit pin 82 extend therethrough. The limit pin 82 functions to engage the wedge member 74 at opposite ends of the opening 80 to thereby control the degree of wedge rotation. This structure provides means for limiting movement of the wedge member 74 to insure that it does not pass into the path of scene radiation traveling towards the upper lens element 68. Of course, the degree of wedge rotation can be adjusted by varying the size of the opening 80. Thus, if desired, the wedge member 74 can attenuate scene radiation passing to the upper lens element 68 as well.

A scene radiation control opening 84 having a generally triangular shape is formed through the light attenuating wedge member 74 for controlling the amount of scene radiation passing to the lower lens element 70. The control opening 84 is constructed and arranged to pass in overlying relationship to the lower lens element 70. Its position depends on the amount of scene radiation desired to be passed. Obviously, the size and configuration of the opening 84 can vary depending on the amount of scene radiation it is desired to pass to the lower lens element 70. In this embodiment the light attenuating wedge member 74 is made of an opaque material. Thus, only scene radiation able to pass to the lens element 70 is through or around the wedge member 74. It should be understood that this invention contemplates having the wedge member 74 made of other optical materials for attenuating the scene radiation incident on the lower optical element 70; particularly the infrared frequencies. In this embodiment, an opaque material is used because it is inexpensive as well as prevents light scattering.

A peripheral marginal flange 86 extends upwardly from the face of the light attenuating wedge member 74. A plurality of internally disposed teeth 88 extend along the inner surface of the arcuate flange member 86. These teeth 88 are constructed for drivingly meshing with a circumferentially toothed portion of a calibration tool (not shown), such as the type described more fully in the noted U.S. Pat. No. 3,942,184. Rotation of the calibration tool causes rotation of the wedge member 74 either in clockwise or counterclockwise direction. The degree of rotation depends upon the desired amount of light attenuation necessary for effecting correct exposure. A more detailed description of the calibrating step will follow. A plurality of teeth 90 on the bottom surface of the flange 86 cooperate with a wedge-shaped detent 92 formed on the lower split lens element 66. As a result of this cooperation, means are provided for accurately indexing rotation of the wedge member 74. Thus, controlled rotational positioning of the wedge member 74 is provided. Also, the wedge member 74 is constructed to generally bias the light attenuating member 72 away from the upper and lower split lens elements and into a retained condition, as will be explained.

Referring back to the light attenuating member 72, it includes a hub portion 94 which is constructed to be mounted for rotation on and about limiting pin 82. In this manner, the light attenuating members 72, 74 can be independently rotated with respect to the other. For calibration purposes, the light attenuating member 74 has a variable neutral density filter portion 96 surrounding the hub portion 94. The neutral density portion 96 begins with a region of minimum filtering, generally indicated by reference numeral 98, and gradually increases continuously to a region 100 of maximum light attenuation. The neutral density filter portion 96 is disposed in light intercepting relationship with both the upper and lower lens elements 68 and 70. Accordingly, rotation of the light attenuating member 72 varies the scene light intensity incident upon both of the lens elements 68 and 70. As will become apparent, the light attenuating member 72 will provide fine or accurate exposure adjustment for the upper lens element 68 and an adjustment for the lower lens element 70 which while not being accurate is relatively accurately adjusted.

For effecting selective and incremental rotation of the light attenuating member 72, a plurality of externally disposed teeth 102 are formed on the periphery thereof. The teeth 102 are constructed to meshingly engage with the peripheral teeth of the calibration tool. Thus, rotation of the calibration tool correspondingly rotates the member 72. Since it is desired to rotate the light attenuating member 72 independent of the wedge member 74, adequate spacing between the teeth 102 and the internal teeth 88 is provided so that the calibration tool engages either one, but not both, of the noted light attenuating members 72, 74 during its rotation. Formed on the exterior face of the light attenuating member 72 adjacent its periphery is a plurality of circumferentially disposed teeth 104. The teeth 104 are constructed and arranged to cooperate with a detent 106 depending from a flange on the distal end of a retaining arm 108 connected at its opposite end to the base block casting 16. The foregoing structure provides means for insuring accurate positioning and indexing of the rotation of the light attenuating member 72. A cantilevered spring-like finger 110 extends from the base block casting 16 and has a retaining portion 112 adjacent to the teeth 102. The retaining portion 112 has a segment 114 which is in overlying relationship to the teeth 104 and engages the latter so as to facilitate the retaining of the light attenuating member 72 in its plane of rotation. Both the distal flange on the arm 108 and the diametrically opposed retaining portion 114 maintain the desired planar arrangement of the member 72.

Operation of the calibrating system 10 for correcting for improper system exposures in both the ambient and strobe modes is as follows. It should be noted that details of the calibrating equipment and steps necessary to correct improper exposures in the system do not, per se, form an aspect of the present invention. Thus, only those details thereof necessary for an understanding of the operation of the present invention will be set forth. Details of a comparable calibrating technique may be had by reference made to the noted U.S. Pat. No. 3,942,184.

In a calibration process to correct for improper exposures, a lamp of known source illumination having uniform intensity is used. The intensity is selected to match the scene light intensity in ambient light. An exposure interval is commenced upon releasing of the shutter blades from their scene light blocking condition to their scene light admitting position. The exposure interval is terminated ultimately by the light detecting station 56 receiving a predetermined amount of light passing through the overlapping photocell apertures 36. Thus, the light detecting station 56 provides an output value indicative of the time integration of the actual scene light intensity sensed and evaluated by it as determined by the scene radiation passing through the photocell apertures 36 and upper lens element 68 during the exposure.

The exposure control system may be calibrated to provide an exposure compatible to a particular film speed in the following manner. The speed of the film intended for use for the subject camera apparatus must first be determined. The speed of a film quite simply is an expression of its sensitivity to light and may be measured by giving samples of the film a range of exposures under standard conditions of illumination. The amount of blackening produced after carefully controlled development is measured and plotted (usually logarithmically) against the exposure to provide a characteristic curve. The data obtained from the characteristic curve is then translated into a speed figure to provide the speed of the film tested. This is done by means of a speed formula which defines the speed as a function of the exposure at a specific point of the characteristic curve.

Once a point has been chosen on the characteristic curve for speed determination, there are two basic ways of stating the speed. The simplest of formula is: Speed = Constant Exposure. The exposure is in this case the sensitometric exposure (time × light intensity) corresponding to the selected reference point on the characteristic curve. Such a speed figure is known as an arithmetic speed, because it is inversely proportional to the exposure. Thus, under a given set of circumstances a material of twice the speed of another material needs half the exposure of the latter to produce the same image density. The constant in the speed formula is an arbitrary one, chosen to yield speed figures that are convenient to handle. The most easily understood speed formula uses a constant of 1, with the exposure measured in meter-candle-seconds. Thus, for our purposes, the film intended for use for the above-described camera apparatus will be considered to have a speed of 0.0725 meter-candle-seconds.

The film speed is thus indicative of the amount of light actually required by the film to achieve a correct exposure. An exposure error results when the actual amount of light passed by the shutter blade elements 26 and 28 to the film plane during an exposure cycle differs from the film speed. Therefore, for our purposes, the term exposure error will relate to the ratio of the amount of light actually passed to the film plane during a photographic exposure cycle to the amount of light required by a particular film speed to achieve a correct exposure.

In this calibration, the phototransducers of the calibrating instrumentation also detects the light incident upon the film plane and provides an output response indicative of the total amount of light incident upon the film plane. A volt meter may be calibrated to display the amount of light incident upon the film plane in terms of meter-candle-seconds which reading may thereafter be compared with the actual film speed to determine exposure error.

Should an unacceptable amount of exposure error occur during, for example, moderate-to-high ambient light, the calibration tool incrementally rotates the teeth 102 and thereby the member 72 a predetermined number of degrees about the shaft 82. The detent 106 serves to facilitate incremental rotation of the member 72. Thus, a different segment of the neutral density filter portion 96 overlaps the upper optical element 80. Other calibration cycles for the ambient mode follow until the exposure error of the exposure control system 24 during ambient is eliminated completely or at least falls within acceptable tolerances.

It will be appreciated that the exposure error of the exposure control system is being corrected under scene light conditions in which the upper lens element 68 is operative. The lighting conditions under which such situations prevail have been enumerated earlier. Additionally, since the light attenuating member 72 overlies the lower lens element 70, it also "coarsely" corrects for conditions causing exposure error when this lens element 70 is effective for controlling exposure. In this regard, it should be noted that the variations of the neutral density filter portion 96 do not vary greatly when the proximity of the upper and lower lens elements 68, 70; respectively, is fairly close. Thus, conditions giving rise to exposure error in the ambient mode (such as shutter blade dynamics, electronic parameters, etc.) can also be roughly corrected for by the member 72 since such conditions would also cause exposure errors in the noted strobe mode. Hence, the fine or accurate adjustment for exposures when the lens element 70 is operative is accomplished by the light attenuating wedge 74.

It should be appreciated that a single light attenuating member could not accurately correct for exposure errors with the lens elements 68 and 70. For instance, the spectral transmissivity of the lens 70 could be significantly "out-of-spec" with the desired transmissivity. Thus, adjustments must be made for situations such as this. After making the necessary calibration for the ambient mode, wherein the lens element 68 is effective, the exposure control system 24 is then calibrated for its response during the strobe mode, wherein the photocell apertures 38 overlap and effectively control the passage of scene radiation from the lower lens element 70 while the flash is being fired. Because the lower lens element 70 is used, only the infrared radiation will be sensed by the photodetector 62. The noted integrating circuit then provides a time integration of the total amount of light entered upon the film during the exposure and, of course, terminates exposure. The calibrating instrumentation reflects the output value caused by such exposure. This output can be compared to the output of the calibration instrumentation to determine whether or not an exposure error exists. Should an unacceptable exposure error exist, the calibrating tool is again used. On this occasion, the calibrating tool engages the teeth 98 for rotating the wedge member 74 so that its position and light control opening 84 are moved to control the amount of scene radiation which can fall on the lower lens element 70. In this manner, the amount of scene light radiation is controlled. This will, of course, change the exposure. For calibrating purposes, another exposure in the stobe mode is taken with the calibration instrument. Should an unacceptable exposure error remain, the calibration tool can again be used to effect rotation of the attenuating member 74 until the proper amount of scene radiation is passed to the lens element 70 for effecting correct exposure. Thus, the light attenuating member 74 provides for accurate adjustment to exposure when the lens element 70 is effective for controlling exposure.

From the foregoing, it is seen that the calibrating system 10 provides a simple, economical and accurate means for independently correcting for exposure errors occuring in an exposure control system during ambient and strobe modes, particularly where the photodetector is responsive to different spectral frequencies.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. In a photographic camera having scene light evaluating means for controlling a camera shutter to provide an appropriate exposure of given film material, the evaluating means including photoresponsive regions having different photoresponsive characteristics, and means for adjusting the intensity of scene radiation incident upon said regions for calibrating said evaluating means to provide a predetermined response for given scene light conditions, the improvement wherein:

said adjusting means includes first means movable into radiation intercepting relation with respect to both said regions to substantially precisely adjust an output of one of said regions while also coarsely adjusting an output of the other of said regions under a given scene light condition, and second means movable into radiation intercepting relation with respect to only said other region to, in combination with said first means, substantially precisely adjust the output of said other of said regions.

2. The apparatus of claim 1 wherein said first means includes a first light attenuating member mounted for rotation so that selective rotation thereof presents different light attenuating segments thereof in scene radiation intercepting relationship with respect to photoresponsive regions so as to substantially precisely correlate the output of said one region to a predetermined output value while coarsely correlating the output of said other region to its predetermined output value; and said second means includes a second light attenuating member mounted for rotation independent of said first light attenuating member so that upon selective rotation of said second member portions thereof are presented in scene radiation intercepting relationship only with respect to said second photorespective region so as to substantially accurately correlate the output of said other region to the predetermined output.

3. The apparatus of claim 2 wherein said one region is responsive generally to visible frequencies to the general exclusion of infrared frequencies, and said other region is responsive generally to infrared frequencies to the general exclusion of visible frequencies; and said first member is a neutral density filter in scene radiation intercepting relationship to both said regions, while said second member is in scene radiation intercepting relationship to only said other region and serves to attenuate infrared frequencies to said second region.

4. The apparatus of claim 3 wherein said second light attenuating member is made of opaque material.

5. The apparatus of claim 3 wherein said first and second light attenuating members include respective means for facilitating rotation of each one independently of the other through a plurality of positions, each of said means for facilitating rotation includes a driving surface constructed to cooperate with a calibrating tool of a given diameter which is able to rotatingly drive each of the driving surfaces, and said surfaces are spaced in proximity to each other so as to face each other and are thereby easily accessible to the same calibrating tool.

6. The apparatus of claim 5 wherein said spaced apart driving surfaces are spaced by a distance greater than said given diameter and sufficient to enable the calibrating tool to rotate either one but not both of said surfaces.

7. The apparatus of claim 3 further including means for providing indexing for each of said first and second members.

8. The apparatus of claim 3 wherein said second light attenuating member includes means for limiting rotational movement thereof so as to prevent said second light attenuating member passing in light intercepting relation to said first region.

9. The apparatus of claim 8 wherein said limiting means includes a post and said second light attenuating member is mounted for rotation about said post.

10. The apparatus of claim 9 wherein said first and second light attenuating members are spaced apart in generally parallel relationship to each other and said first member is constructed to bias said second member away therefrom, and further including means for engaging said second member for retaining said first and second members in said generally parallel relationship.

* * * * *